(12) United States Patent
Oshima

(10) Patent No.: US 7,661,888 B2
(45) Date of Patent: Feb. 16, 2010

(54) FEMALE FERULE

(75) Inventor: Tsuyoshi Oshima, Gotemba (JP)

(73) Assignee: Yazaki Corporation, Tokyo (JP)

( * ) Notice: Subject to any disclaimer, the term of this patent is extended or adjusted under 35 U.S.C. 154(b) by 212 days.

(21) Appl. No.: 11/856,238

(22) Filed: Sep. 17, 2007

(65) Prior Publication Data

US 2009/0136182 A1      May 28, 2009

(30) Foreign Application Priority Data

Sep. 15, 2006   (JP)   ............... 2006-250215

(51) Int. Cl.
  *G02B 6/36*   (2006.01)
(52) U.S. Cl. ............... 385/78; 385/76; 385/77; 385/80; 385/85
(58) Field of Classification Search ............ 385/53–55, 385/69, 76–78, 80, 85
  See application file for complete search history.

(56) References Cited

U.S. PATENT DOCUMENTS

| | | | |
|---|---|---|---|
| 3,846,010 A | 11/1974 | Love et al. | |
| 3,958,114 A | * | 5/1976 | Codrino ............... 362/581 |
| 4,139,260 A | * | 2/1979 | Bouygues et al. ............... 385/53 |

FOREIGN PATENT DOCUMENTS

| | | | |
|---|---|---|---|
| DE | 2428595 A1 | | 1/1975 |
| DE | 2449441 A1 | | 4/1975 |
| DE | 19736038 | * | 2/1999 |
| DE | 19736038 A1 | | 2/1999 |
| DE | 10004953 A1 | | 8/2001 |
| JP | 2003-149515 A | | 5/2003 |

OTHER PUBLICATIONS

German Office Action dated Oct. 21, 2008.

* cited by examiner

*Primary Examiner*—Frank G Font
*Assistant Examiner*—Michael P Mooney
(74) *Attorney, Agent, or Firm*—Sughrue Mion, PLLC

(57) ABSTRACT

A female ferule is fixed to a terminal of a multi-core optical fiber in which a sheath is provided outside a large number of optical fibers being tied in a bundle and a portion of the sheath is removed. The female ferule includes a ferule body which includes a cylindrical portion and a step which is formed on an outer surface and at a rear side of the cylindrical portion, and a sleeve which includes an insertion-connected portion for a male ferule serving as a connection partner at the one end and a coupling-connected portion for the cylindrical portion at the other end. The sleeve is retrofitted to the ferule body. The cylindrical portion includes a caulking-fed portion for the bundle optical fibers and an insertion/coupling-fixed portion for the coupling-fixed portion, the caulking-fixed portion and the insertion/coupling-fixed portion are formed successively from a front end face of the cylindrical portion.

4 Claims, 9 Drawing Sheets

US 7,661,888 B2

FEMALE FERULE

BACKGROUND OF THE INVENTION

This invention relates to a ferule fixed to the terminal of an optical fiber, and more particularly to a female ferule fixed to the terminal of, preferably, a multi-core optical fiber.

In recent years, a system has been adopted in which a portion of a wire harness is replaced by an optical fiber and for example, the respective nodes are connected to one another through the optical fiber. As such a system, there is a previously known optical module disclosed in e.g. the following Patent Reference 1. In FIG. 8, reference numeral 1 denotes an optical module disclosed in the following Patent Reference 1. The optical module 1 is a "big-table type" module which includes a circuit board 2, a light receiving/emitting portion (light transmitter/receiver) 3 mounted on the circuit board 2, a pair of connectors 4,4 provided at the end of the circuit board 2, and relay optical fibers 5, 5 which optically connect the light receiving/emitting portion 3 and the connectors 4, 4.

At the respective ends of the optical fiber cables 5, 5, ferules 6, 6 (see FIGS. 9A to 9C) are fixed. The ferules 6, 6 are housed within the connectors 4, 4, respectively. The connector 4, 4 is formed in a receptacle shape. An optical connector 7, 7 is connected to such a connector 4, 4 by fitting. The optical connector 7, 7 is formed in a plug shape. The optical connector 7, 7 is provided at the terminal of an optical fiber cable 8, 8. At the terminal of the optical fiber cable 8, 8, a ferule 9, 9 (see FIGS. 9A to 9C) housed in the optical connector 7, 7 is provided.

The ferule 6, 6 of the terminal of the optical fiber cable 5, 5 is formed in the same shape as the ferule 9,9 of the terminal of the optical fiber cable 8, 8. Within the connector 4, 4 and optical connector 7, 7 which are fit to each other, their front end faces are opposite to each other and their optical axes agree with each other.

Now referring to FIGS. 9A to 9C, an explanation will be given of the optical fiber cable 5, 8 and the ferule 6, 9. The optical fiber cable 5, 8 includes an optical fiber 10 composed of a core and a cladding, and a primary sheath 11 and a secondary sheath 12 with which the optical fiber 10 is covered. In order to fix the ferule 6, 9, the terminal of the optical fiber cable 5, 8 is worked so that the primary sheath 11 and secondary sheath 12 are removed and the optical fiber 10 is exposed by a predetermined length.

The ferule 6, 9 is formed in a nearly cylindrical shape composed of a small-diameter portion 13 and a large-diameter portion 14. The ferule 6, 9 is formed to straightly penetrate from its front end face 15 to its read end face 16. The inner diameter of the small-diameter portion 13 is set to agree with the outer diameter of the optical fiber 10. The inner diameter of the large-diameter portion 14 is set to agree with the outer diameter of the primary sheath 11. The end of the secondary sheath 12 is adapted to hit on the rear end 16.

The terminal processing is performed as follows, Epoxy adhesive is applied on the terminal of the optical fiber cable 5, 8. This terminal is internally inserted into the ferule 6, 9. The adhesive is dried. After this fixing, the optical fiber 10 projected from the front end face 15 is cut or ground.

Patent Reference 1: JP-A-2003-149515

In order that the respective front end faces 15 of the ferules 6, 9 are opposite so that their optical axes are not deviated from each other, the inventors of this invention intends to integrally form the cylindrical portion, into which the small-diameter portion 13 of the ferule 9 can be inserted, to the front end face 15 of the ferule B. However, if the cylindrical portion is formed integrally to the front end face 15 of the ferule 6, in the terminal processing, disadvantageously, it becomes very difficult to perform the cutting or grinding of the optical fiber 10 projected from the front end face 15 (As the case may be, the cutting or grinding cannot be done). Further, if shaving refuse internally remains on the cylindrical portion in the cutting or grinding, disadvantageously, this may influence an optical connection portion.

Additionally, in order to obviate the above inconvenience, in removing the primary sheath 11 and secondary sheath 12, it can be proposed to precisely manage the exposed size of the optical fiber 10. However, in order to realize this proposal, may difficulties must be overcome.

Meanwhile, there is a previously known "multi-core optical fiber in which a large number of optical fibers being tied is covered with an outer cladding. This multi-core optical fiber has such a structure that removal of the cladding at the terminal will unbraid the large number of optical fibers. Therefore, if the multi-core optical fiber with such loosening is employed in place of the optical fiber cable 5, the above problem of the ferule in which the cylindrical portion is integrally formed to the front end face will be further complicated.

SUMMARY OF THE INVENTION

This invention has been accomplished in view of the above circumstance. An object of this invention is to provide a female ferule particularly suited to a multi-core optical fiber.

In order to attain the above object, the invention provides a female ferule which is fixed to a terminal of a multi-core optical fiber in which a sheath is provided outside a large number of optical fibers being tied in a bundle and a portion of the sheath is removed, the female ferule comprising:

a ferule body which includes a cylindrical portion and a step which is formed on an outer surface and at a rear side of the cylindrical portion; and a sleeve which includes an insertion-connected portion for a male ferule serving as a connection partner at the one end and a coupling-connected portion for the cylindrical portion at the other end, wherein the sleeve is retrofitted to the ferule body; and wherein the cylindrical portion includes a caulking-fixed portion for the bundle optical fibers and an insertion/coupling-fixed portion for the coupling-fixed portion, the caulking-fixed portion and the insertion/coupling-fixed portion are formed successively from a front end face of the cylindrical portion.

In accordance with this invention having such a feature, first, only the ferule body is fixed to the terminal of the multi-core optical fiber by caulking. Next, the sleeve is retrofitted to the ferule body. Thus, the female ferule is attached to the terminal of the multi-core optical fiber. A series of steps of terminal processing can be relatively easily executed.

The method of retrofitting the sleeve is executed in a fitting relationship in sizes. This method is also done through fixing by press-fitting, welding or deposition (the fixing may be done in combination of these techniques). The ferule body is made of metal, whereas the sleeve may be made of metal or resin.

As regards optical connection after the terminal processing, the small-diameter portion of a male ferule se ring as a connection partner is inserted into the insertion-connected portion of the female ferule. The sleeve of the female ferule serves as a guide for the male ferule. When the small-diameter portion of the male ferule is inserted into the insertion-connected portion of the female ferule, the front end face of the male ferule is opposite to the front end face of the cylindrical portion located at the inside of the insertion-connected portion so that their optical axes are not deviated from each other. The fiber end face exposed to the front end of the cylindrical portion has a structure workable in the same method as the male ferule before the sleeve is retrofitted. The working is not a difficult operation. Shaving refuse can be also easily disposed of. As a result, the assembling operation and optical connection can be done preferably.

In accordance with this invention, the terminal of the multi-core optical fiber is fixed to the calking-fixed portion of the ferule body by caulking. The caulking-fixed portion is formed near the front end face of the cylindrical portion. For this reason, the large number of optical fibers being tied in a bundle can be fixed to the female ferule with no loosening.

Preferably, when the outer end face of the coupling-fixed portion is abutted against the step, the inner end face of the insertion-connected portion and the end face of the cylindrical portion are nearly flush with each other.

In accordance with this invention having such a feature, the positioning operation in retrofitting the sleeve can be easily done. In the optical connection to the male ferule, the front end face of the male ferule is opposite to the front end of the cylindrical portion with an optimum interval therebetween.

Preferably, adhesive hardened after the caulking-fixed portion is caulked is previously applied to the large number of optical fibers being tied in a bundle.

Preferably, the caulking-fixed portion is deformed so as to reduce its diameter to compress the bundle optical fibers.

In accordance with this invention having such a feature, if the adhesive is hardened, for example, immediately after caulking, the holding force for the terminal of the multi-core optical fiber fixed to the caulking-fixed portion of the ferule body can be improved.

In accordance with the above configuration, there is provided a female ferule capable of facilitating the terminal processing and also improving the optical connection.

In accordance with the above configuration, there is provided a female ferule capable of facilitating an assembling operation during the terminal processing and also further improving the optical connection with an optimum size relationship.

In accordance with the above configuration, the holding force for the terminal of the multi-core optical fiber can be improved. In accordance with this invention, on the assumption that the holding force varies in holding the terminal by caulking, the variation can be reduced using the adhesive. Thus, there is provided a further improved female ferule.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1:
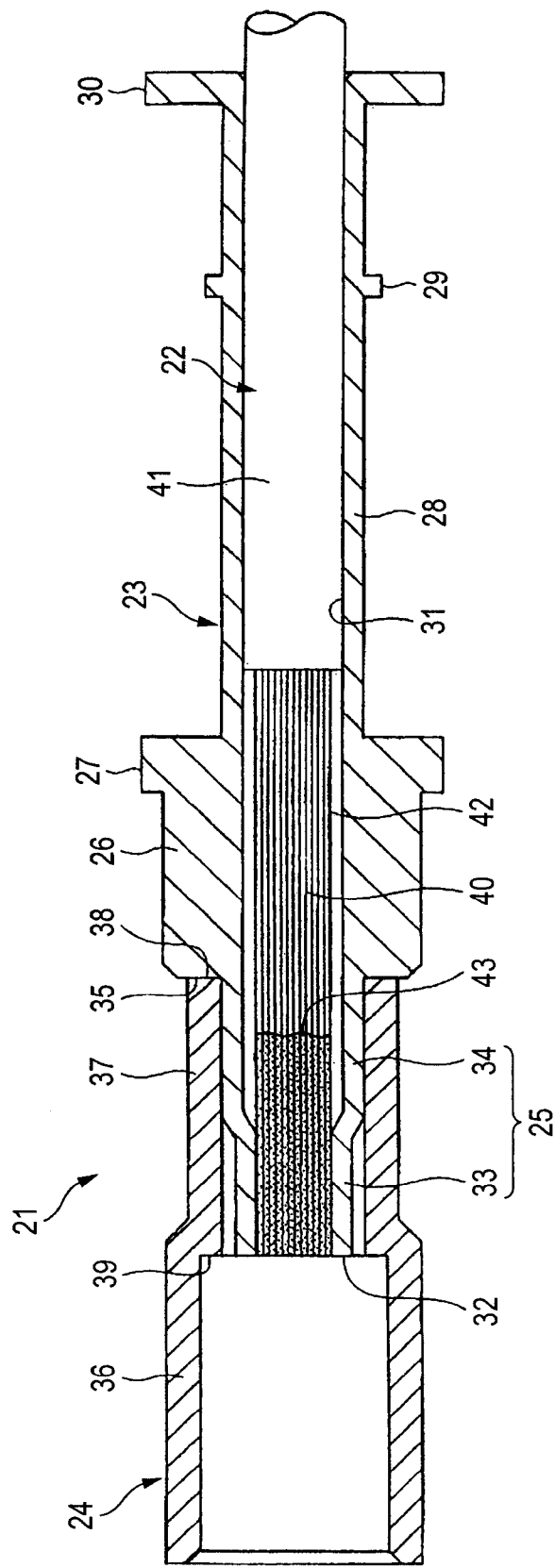
FIG. 1 is a sectional view of a terminal processed portion showing an embodiment of the female ferule according to this invention.
Figure 2:
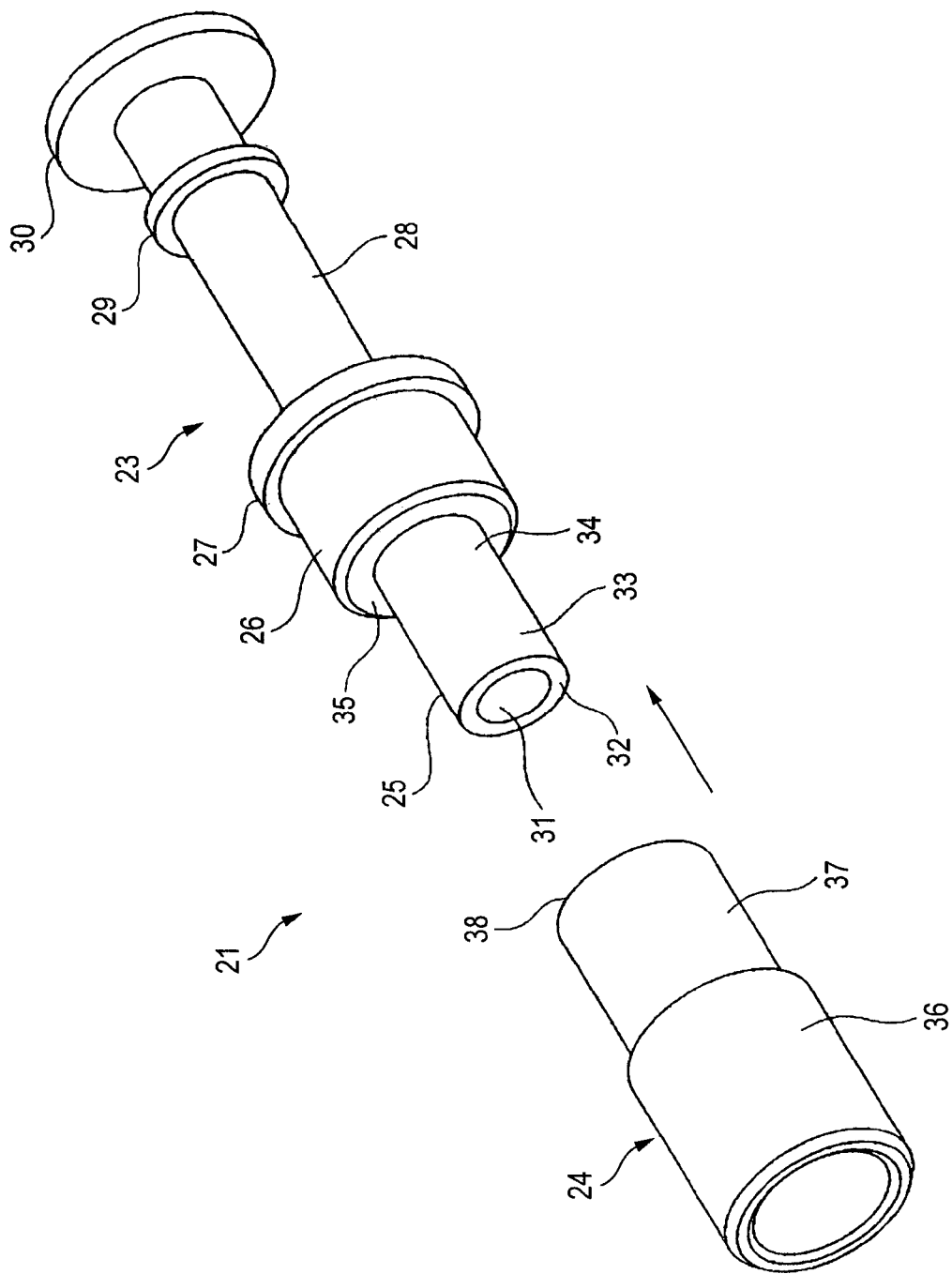
FIG. 2 is an exploded perspective view of the female ferule.
Figure 3:
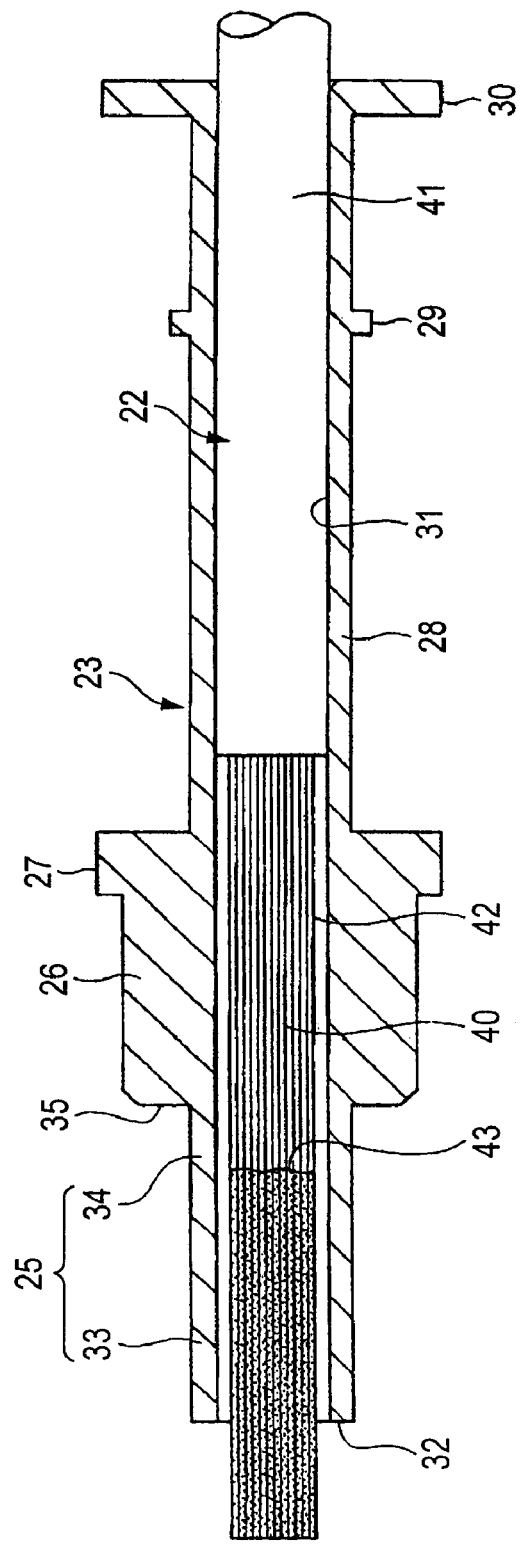
FIG. 3 is a first view for explaining terminal processing.
Figure 4:
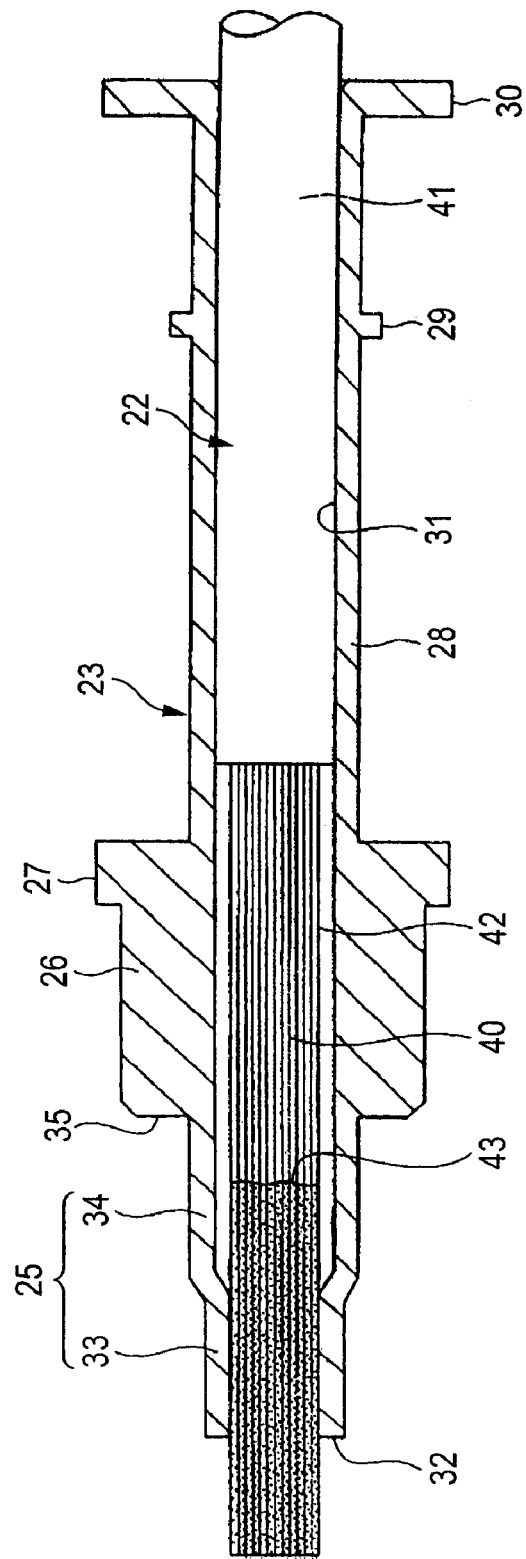
FIG. 4 is a second view for explaining terminal processing.
Figure 5:
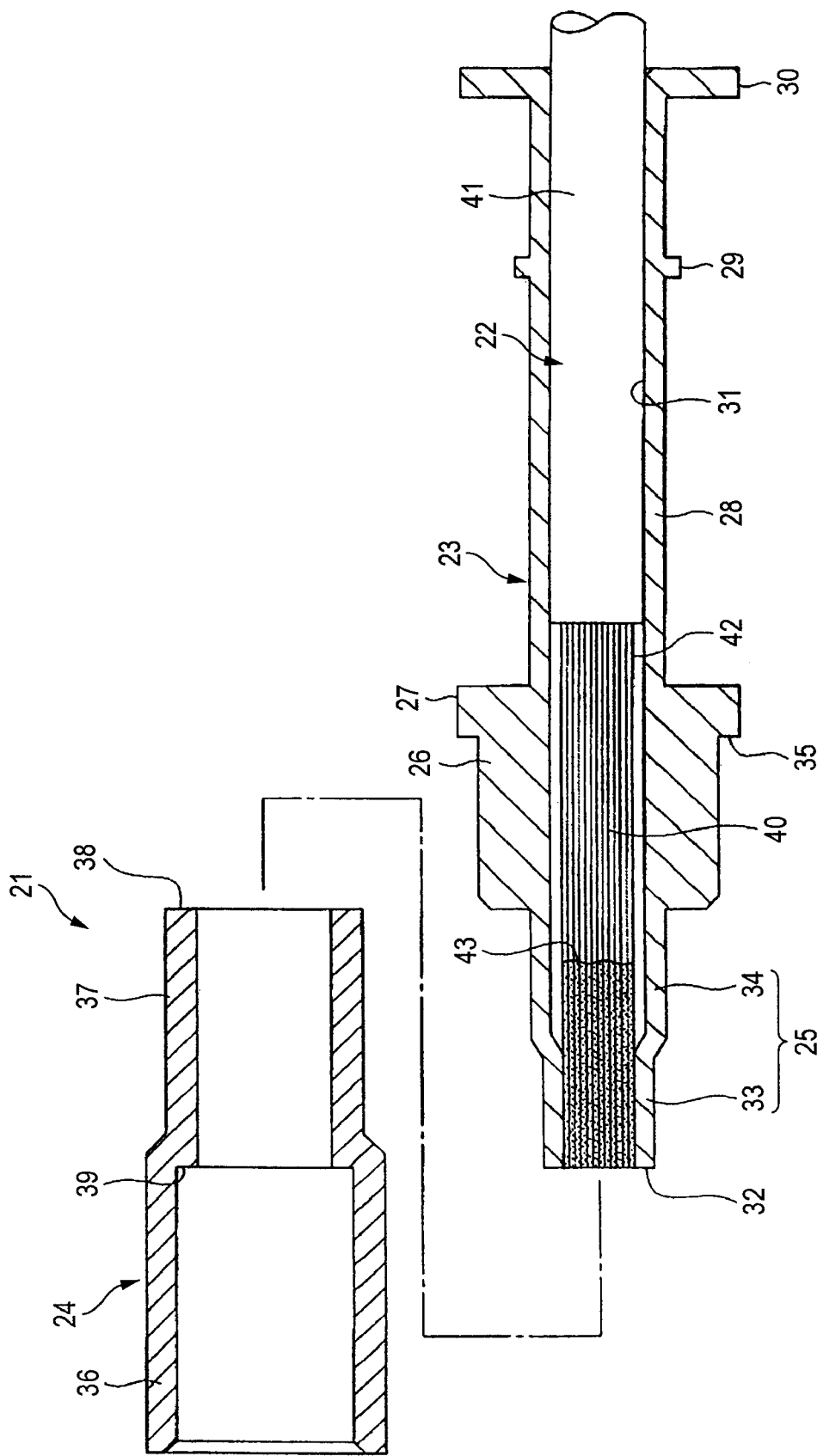
FIG. 5 is a third view for explaining terminal processing.

Now referring to the drawings, an explanation will be given of this invention. FIG. 1 is a sectional view of a terminal processed portion showing an embodiment of the female ferule according to this invention. FIG. 2 is an exploded perspective view of the female ferule. FIGS. 3 to 5 are views for explaining terminal processing.

Figure 9A:
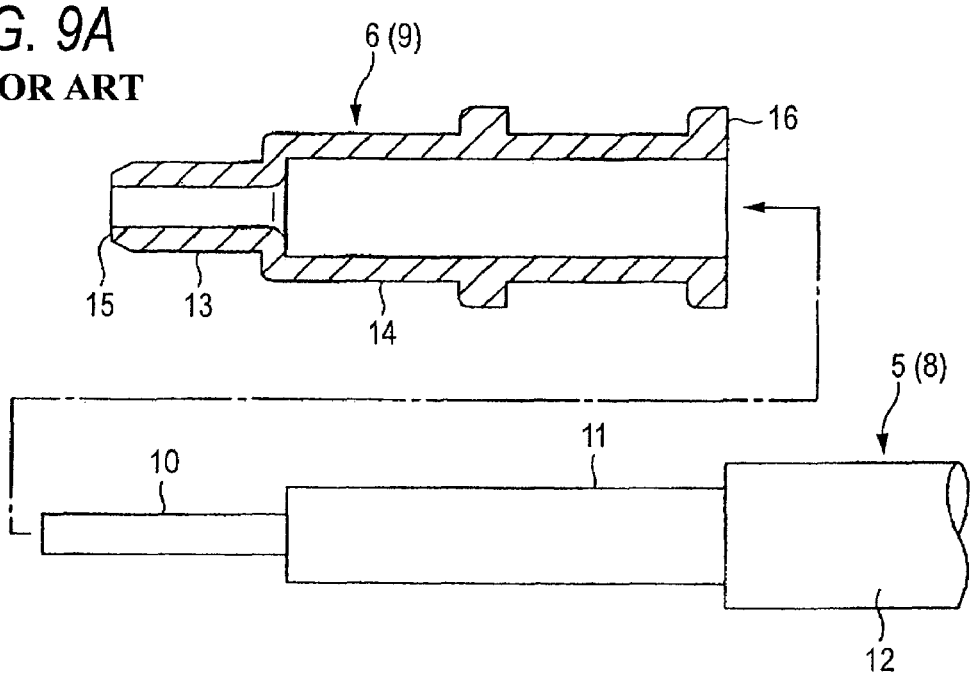
FIGS. 9A to 9C are sectional views of a ferule and an optical fiber cable.
Figure 9B:
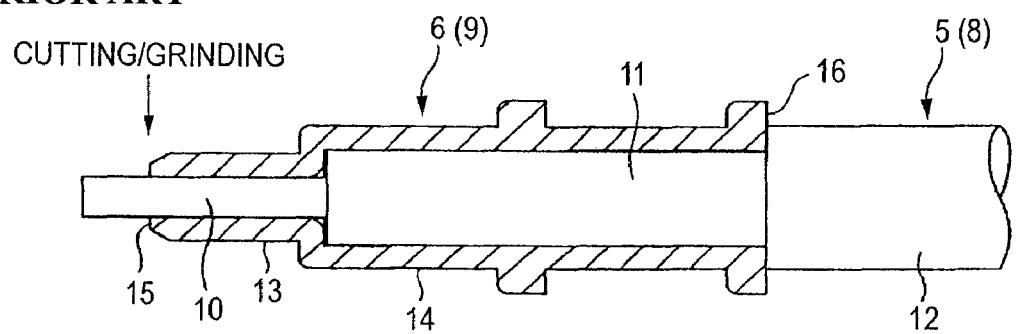
Figure 9C:
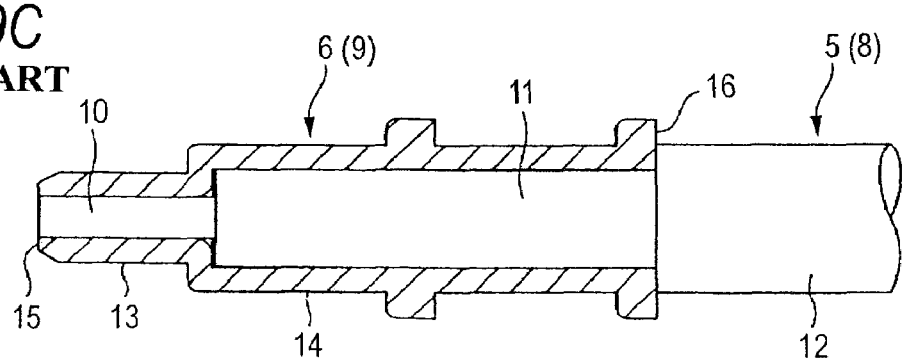

In FIG. 1, reference 21 denotes a female ferule according to this invention. Reference 22 denotes a multi-core optical fiber in which the female ferule 21 is attached to its terminal to complete the terminal processing. The female ferule 21 is formed in a female shape and also is to be attached to the terminal of the multi-core optical fiber 22. Nevertheless, the female ferule 21 is designed so as to facilitate the terminal processing and make the optical connection to a male ferule (not shown, see the ferule 8 in FIG. 9) preferable. Further, the female ferule 21 is designed so that it can contribute to the alignment in the optical connection to the male ferule and reduce gap loss by means of the shape of itself.

In FIGS. 1 and 2, the female ferule 21 includes a ferule body 23 and a sleeve 24 which is retrofitted to the ferule body 23. The ferule body 23 is made of metal and the sleeve 24 is metal or synthetic resin. If these components are made of metal, for example, they can be manufactured by cutting cut brass. They can be manufactured by squeezing metal such as general brass or aluminum.

The ferule body 23 includes a cylindrical portion 25 having a small diameter, a large-diameter portion 26 successive to the cylindrical portion 25, a large flange 27 successive to the large-diameter portion 26, a slender small-diameter portion 28 successive to the large flange 27, a small flange 29 formed at the middle of the slender small-diameter portion 28 and a large flange 30 successive to the end of the slender small portion 28. The ferule body 23 has a fiber inserting portion 31 formed so as to agree with the diameter of the multi-core optical fiber 22. The fiber inserting portion 31 is formed to straightly penetrate with the same diameter from the front end face 32 of the cylindrical portion 25 to the large flange 30. The ferule body 23 itself, as shown, is formed in a cylindrical shape very similar to the male ferule (its shape is different from that of the male ferule 8 in FIG. 9).

The front end face 32 of the cylindrical portion 25 is formed as a flat plane orthogonal to a ferule axis. At the front and face 32, one end of the fiber inserting portion 31 is opened. The cylindrical portion 25 includes a caulking-fixed portion 33 of a larger number of optical fibers being tied in a bundle 42 (described later) of the multi-optical fiber 22 and an insertion/coupling-fixed portion 34 secured to a coupling-fixed portion 37 (described later) of the sleeve 24. The caulking-fixed portion 33 is located behind the front end face 32. The insertion coupling-fixed portion 34 is located behind the caulking-fixed portion 33. When the caulking-fixed portion 33 is subjected to caulking, it is deformed to reduce the diameter so that the large number of optical fibers being tied in a bundle 42 described later are held in their compressed state.

Incidentally, the cylindrical portion 25 is called a cylindrical portion in this invention because it has a cylindrical shape before the sleeve 24 is retrofitted. The reason why the cylindrical portion 25 is not called simply "the small-diameter portion" is as follows. Although it is formed in the same shape as the small-diameter portion of a conventional male flange when it is judged from the shape before the sleeve 24 is retrofitted, it has a clear difference therefrom. Specifically, the cylindrical portion 25 in this invention has the calking-fixed portion 33 and the insertion coupling-fixed portion 34 so that its shape will be changed by caulking and retrofitting of the sleeve 24. Further, its function is different from that of the small diameter portion of the male flange. These points are clear differences.

At a continuous portion between the cylindrical portion 25 and the large diameter portion 26, a step 35 is formed. The step 35 is formed as a portion which is generated by a difference in diameter between the cylindrical portion 25 and the large diameter portion 26. In retrofitting, the sleeve 24 hits on this step 35. Since the sleeve 24 hits on, the positioning of the sleeve 24 can be easily performed. The distance from the front end 32 face of the cylindrical portion 25 to the step 35 can be set for a predetermined length.

The large flange 27, small flange 29 and large flange 30 are used for fixing to a housing (ferule housing later explained referring to FIG. 6).

The sleeve 24 is prepared as another member which is to be retrofitted to the cylindrical portion 25 of the ferule body 23. The sleeve 24 is formed in a shape to be a cylinder as shown. The sleeve 24 includes an insertion-connected portion 36 for the male ferule serving as a connection partner and a coupling-connected portion 37 for the cylindrical portion 25. The insertion-connected portion 36 and coupling-connected portion 37 are formed to be successive to each other. The insertion-connected portion 36 and coupling-connected portion 37 are formed to have steps on both inner and outer walls. The insertion-connected portion 36 serves as a guide for the made ferule.

As regards the sleeve 24, reference numeral 38 denotes an outer end face of the coupling-fixed portion 37. Reference numeral 39 denotes an inner end face of the insertion-connected portion 36. The sleeve 24 is formed in a shape with a step so that the inner end face 39 of the insertion-connected portion 36 also serves as the internal end face of the coupling-connected portion 37.

The internal diameter of the coupling-fixed portion 37 is designed in a fitting relationship (JIS B 0401-1) with the outer diameter of the cylindrical portion 25. In this embodiment, the coupling-fixed portion 37 and cylindrical portion 25 are formed so as to provide an interference fit (If the fitting relationship is a transition fit, they may be secured by a suitable technique such as resistance welding, laser welding or ultrasonic welding after press-fitting. Further, they may be secured using adhesive.)

The multi-core optical fiber 22 includes optical fibers 40, each composed of a core and a clad, and a sheath 41 disposed around the optical fibers 40 such that the large number of optical fibers 40 are tied in a bundle. In order that the female ferule 21 is attached to the terminal of the multi-core optical fiber 22, the multi-core optical fiber 22 is removed by a predetermined length (By removing the sheath 41 by a predetermined length, the large number of optical fibers being tied in a bundle 42 are exposed in the predetermined length).

The multi-core optical fiber 22, although not particularly limited, may be the optically fibers 40 made of glass (e.g. MC-GOF). In this case, the optical fiber 40 is a glass fiber having a diameter of several tens of micron. Two hundreds to three hundreds of optical fibers 40 are tied in a bundle 42 of the large number of optical fibers (Not the glass fiber but a plastic fiber may be employed. In this embodiment, since the glass fiber is adopted, it has a melting point of 125° C. to 150° C. that is higher than 95° C. of the plastic fiber. If heat resistance is considered, the glass fiber is preferably adopted).

As regards the multi-core optical fiber 22, although not limited, with the sheath 41 at the terminal thereof being removed by a predetermined length, an adhesive 43 is instantaneously applied on the larger number of optical fibers tied in a bundle 42. The instant glue (adhesive) 43 will be hardened after several minutes from when it has been applied (For example, type AT8816 commercially available from NTT-AT. It intends to enhance the holding force in a manner that it is hardened when a final gliding step is completed in the terminal processing with the female ferule 21).

Next, referring to FIGS. 1 to 5, an explanation will be give of the terminal processing. FIGS. 3 to 5 are views for explaining the terminal processing.

In the terminal processing, first, the multi-core optical fiber 22, in which the sheath 41 is removed by a predetermined length to expose the large number of optical fibers being tied in a bundle 42, and ferule body 23, as shown in FIG. 3, are inserted into the fiber inserting portion 31. As regards application of the instant glue 43 to the exposed portion of the large number of optical fibers being tied in a bundle 42, after it is applied, the ferule body 23 may be inserted into the fiber inserting portion 31; otherwise, the adhesive may be applied after the ferule body 23 is first inserted and moved toward the sheath 41, and further the ferule body 23 may be moved to the position as shown in FIG. 3.

Thus, as shown in FIG. 3, the tip of the large number of optical fibers tied in a bundle 42 is projected from the front end face 32 of the cylindrical portion 25. Next, as shown in FIG. 4, the caulking-fixed portion 33 of the cylindrical portion 25 is caulked to reduce its diameter. Thus, the large number of optical fibers being tied in a bundle 42 is held in a compressed state. It should be noted that only the caulking-fixed portion 33 of the cylindrical shape 25 is caulked and the outer diameter of the insertion/coupling-fixed portion 34 thereafter formed will not be changed).

Thus, the caulking-fixed portion 33 of the cylindrical portion 25 is caulked so that the large number of optical fibers tied in a bundle 42 is held in a compressed state. Next, the portion projected from the front end face 32 is removed and ground, which results in the state as shown in FIG. 5. Thus, the front end face 32 and tip of the large number of optical fibers tied in a bundle 42 become flush with each other.

Finally, as shown in FIGS. 5 and 1, the sleeve 24 is fit over the cylindrical portion 25 of the ferule body 23 so that the coupling-fixed portion 37 and insertion/coupling-fixed portion 34 are fixed by fitting, thereby providing the retrofitted state of the sleeve 24 and the female ferule 21 as shown in FIG. 1. Thus, a series of steps of the terminal processing are completed.

The sleeve 24 is retrofitted so that the outer end face 38 of the coupling-connected portion 37 hits on the step 35 of the cylindrical portion 25. When the outer end face 38 of the coupling-connected portion 37 and the step 35 of the cylindrical portion 25 hit on each other, the internal end face 39 of the insertion-connected portion 36 of the sleeve 24, front end face 32 of the ferule 23 and tip of the larger number of optical fibers being tied in a bundle 42 become flush with one another. Not by means of hitting, the sleeve 24 may be retrofitted so that the internal end face 39 of the insertion-connected portion 36 is flush with the front end face 32 of the ferule body 23.

When it is intended that the female ferule 21 having been subjected to the terminal processing and the male ferule (not shown) are optically connected, the small-diameter portion of the male ferule is inserted into the insertion-connected portion 36 of the sleeve 24 of the female ferule 21 and internally guided. Thus, the front end face of the male ferule is opposite to the front end face 32 of the cylindrical portion 25 located at the inside of the insertion-connected portion 36. Owing to the presence of the sleeve 24, the male ferule and female ferule 21 are optically connected so that their optical axes are not deviated from each other.

As explained hitherto referring to FIGS. 1 and 5, in accordance with this invention, the terminal processing can be facilitated and optical connection can be improved. Thus, this invention provides a further improved female ferule 21.

Next, referring to FIGS. 6 and 7, an explanation will be given of the structure of an optical module using the female ferule 21 (The structure is exemplary). FIG. 6 is an exploded perspective view of the optical module and FIG. 7 is a perspective view of the optical module.

Figure 6:
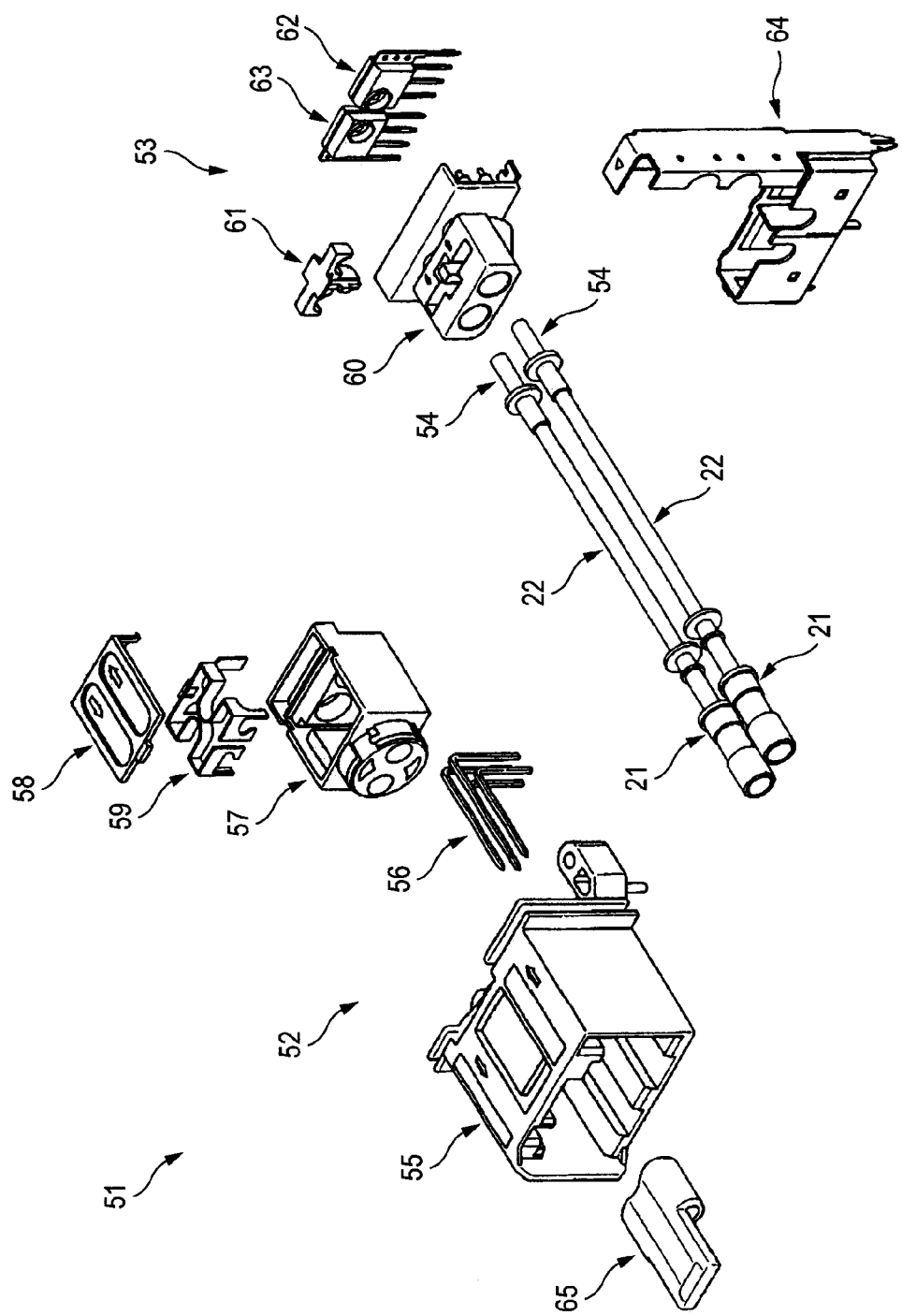
FIG. 6 is an exploded perspective view of an optical module.
Figure 7:
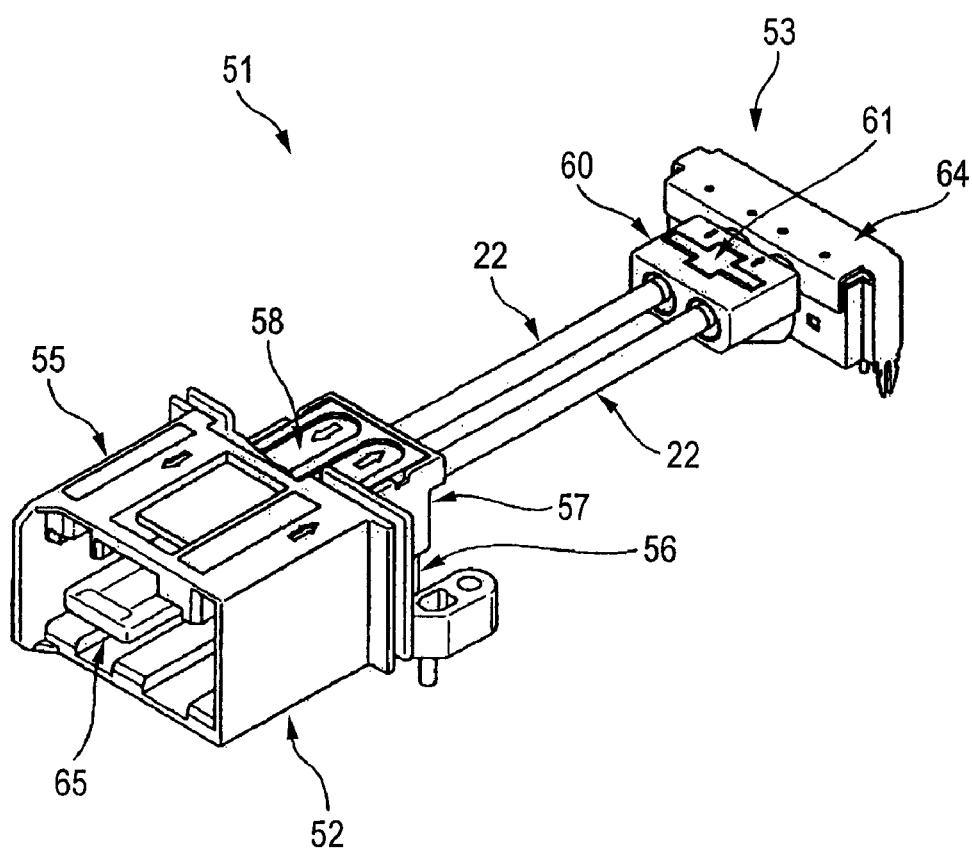
FIG. 7 is a perspective view of the optical module.
Figure 8:
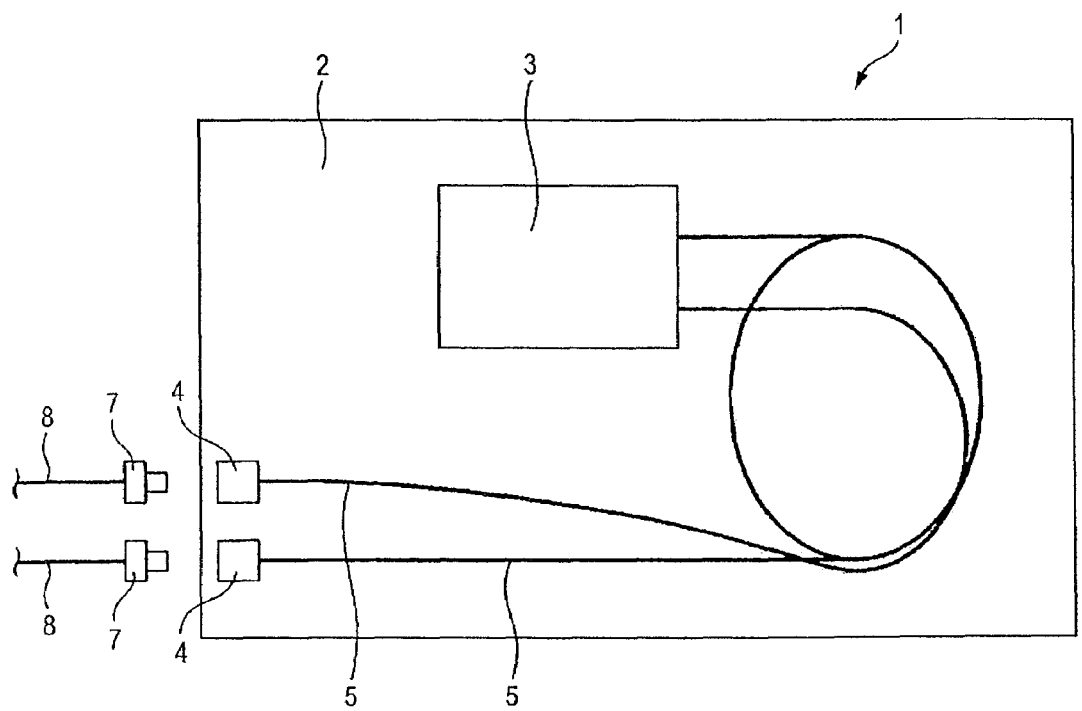
FIG. 8 is a structural view of a conventional optical module.

In FIGS. 6 and 7, an optical module 51 is a big-table type of module which includes a connector unit 52, a light receiving/emitting unit 53 and relay-use multi-core optical fibers 22, 22. At the respective terminals of the multi-core optical fiber 22, 22, the female ferule 21, 21 according to this invention to be housed in the connector unit 52 and ferule 54, 54 to be optical connected to the light receiving/emitting unit 63 are fixed.

The connector unit 52 includes a connector housing 55, a plurality of PCB terminals 56, a ferule housing 57, a cover 58 and a spring 59.

The light receiving/emitting unit 53 includes an FOT case 60, a holder 61, a light-emission side FOT 62 and a light-reception side FOT 63, and a shielding case 64.

Reference numeral 65 denotes a dust cap. The dust cap 65 is provided so that dust is not deposited on an optically-connected portion (female ferules 21, 21), for example, while the optical module 51 is mounted on a circuit board not shown.

It is needless to say that this invention can be realized in various manners not departing from the sprit of the invention.

Additionally, in the explanation hitherto made, this invention has been applied to the multi-core optical fiber 22. However, this invention may be applied to a bundle fiber or image fiber in which the optical fiber strands are bundled in their few to several hundreds or several thousands of cores.

Further, it is needless to say that this invention can be applied to a general optical fiber cable or POF (Plastic Optical Fiber) with a single core.

What is claimed is:

1. A female ferule which is fixed to a terminal of a multi-core optical fiber in which a sheath is provided outside a large number of optical fibers being tied in a bundle and a portion of the sheath is removed, the female ferule comprising:
    a ferule body which includes a cylindrical portion and a step which is formed on an outer surface and at a rear side of the cylindrical portion; and
    a sleeve which includes an insertion-connected portion for a male ferule serving as a connection partner at the one end and a coupling-connected portion for the cylindrical portion at the other end,
    wherein the sleeve is retrofitted to the ferule body; and
    wherein the cylindrical portion includes a caulking-fixed portion for the bundle optical fibers and an insertion/coupling-fixed portion for the coupling-fixed portion, the caulking-fixed portion and the insertion/coupling-fixed portion are formed successively from a front end face of the cylindrical portion.

2. The female ferule according to claim 1, wherein when an outer end face of the coupling-fixed portion is abutted against the step, an inner end face of the insertion-connected portion and an end face of the cylindrical portion are nearly flush with each other.

3. The female ferule according to claim 1, wherein adhesive hardened after the caulking-fixed portion is caulked is previously applied to the bundled optical fibers.

4. The female ferule according to claim 1, wherein the caulking-fixed portion is deformed so as to reduce its diameter to compress the bundle optical fibers.

* * * * *